US012662561B2

(12) United States Patent (10) Patent No.: US 12,662,561 B2
Zhang et al. (45) Date of Patent: Jun. 23, 2026

(54) METHODS FOR PRODUCING BIMODAL POLYOLEFINS AND IMPACT COPOLYMERS

(71) Applicant: ExxonMobil Chemical Patents Inc., Baytown, TX (US)

(72) Inventors: Xiaodan Zhang, Houston, TX (US); Christopher G. Bauch, Seabrook, TX (US); Todd S. Edwards, League City, TX (US); Mark S. Chahl, Friendswood, TX (US); Blu E. Englehorn, Houston, TX (US); Khoa To, Baytown, TX (US); Steven L. Lambert, Webster, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 944 days.

(21) Appl. No.: 17/791,389

(22) PCT Filed: Jan. 7, 2021

(86) PCT No.: PCT/US2021/012456
§ 371 (c)(1),
(2) Date: Jul. 7, 2022

(87) PCT Pub. No.: WO2021/150377
PCT Pub. Date: Jul. 29, 2021

(65) Prior Publication Data
US 2023/0056312 A1 Feb. 23, 2023

Related U.S. Application Data

(60) Provisional application No. 62/965,426, filed on Jan. 24, 2020.

(30) Foreign Application Priority Data

Mar. 17, 2020 (EP) .................................... 20163483

(51) Int. Cl.
$C08F\ 110/06$ (2006.01)
$C08L\ 23/14$ (2006.01)

(52) U.S. Cl.
CPC ............. *C08F 110/06* (2013.01); *C08L 23/14* (2013.01); *C08L 2205/025* (2013.01); *C08L 2314/02* (2013.01)

(58) Field of Classification Search
CPC .... C08F 110/06; C08F 2/001; C08F 2500/05; C08F 2500/12; C08F 2500/15; C08L 2205/025; C08L 23/14; C08L 2314/02
See application file for complete search history.

(56) References Cited

U.S. PATENT DOCUMENTS

| | | | |
|---|---|---|---|
| 6,350,828 B1 | 2/2002 | Takaoka et al. | |
| 2005/0170949 A1 * | 8/2005 | Xiao ...................... | B01J 31/068 |
| | | | 502/118 |

FOREIGN PATENT DOCUMENTS

| | | | | |
|---|---|---|---|---|
| EP | 1726602 A1 * | 11/2006 | ............ | C08F 110/06 |
| EP | 2397517 B1 | 12/2011 | | |
| EP | 3636680 B1 | 4/2020 | | |
| WO | 2019089111 A1 | 5/2019 | | |
| WO | 2021/150377 A1 | 7/2021 | | |

OTHER PUBLICATIONS

Written Opinion and International Search report of corresponding PCT application No. PCT/US2021/012456 mailed May 6, 2021.

* cited by examiner

*Primary Examiner* — Ana L. Woodward
(74) *Attorney, Agent, or Firm* — Vorys, Sater, Seymour and Pease LLP

(57) ABSTRACT

Provided are methods for producing bimodal polyolefins comprising the steps of contacting α-olefin monomers with a catalyst in slurry polymerization conditions in the presence of zero to minimum hydrogen to produce a high molecular weight polyolefin and contacting additional α-olefin monomers in gas phase polymerization conditions and the high molecular weight polyolefin and the catalyst to produce bimodal polyolefin having high stiffness and broad molecular weight distribution. An additional step of polymerizing the bimodal polyolefin with a comonomer in a second gas phase can provide a bimodal impact copolymer having high stiffness and broad molecular weight distribution. Among the advantages of the present methods, bimodal polyolefins can be produced in a continuous process between a slurry polymerization reactor and a gas phase polymerization reactor without a venting step in between and with minimal hydrogen in the slurry polymerization reactor.

20 Claims, 5 Drawing Sheets

METHODS FOR PRODUCING BIMODAL POLYOLEFINS AND IMPACT COPOLYMERS

CROSS-REFERENCE TO RELATED APPLICATIONS

This application claims the priority benefit of U.S. Ser. No. 62/965,426, filed Jan. 24, 2020, and EP 20163483.9, filed Mar. 17, 2020, the disclosures of which are incorporated herein by reference.

FIELD OF THE INVENTION

The present invention is directed to methods of polymerizing $\alpha$-olefin monomers to produce bimodal polyolefins and impact copolymers.

BACKGROUND OF THE INVENTION

Flex modulus (stiffness) is an important property for polyolefins, particularly polypropylene and impact polypropylene copolymers (ICP). Broad molecular weight distribution is important as it further combines desirable mechanical properties with good processability. For instance, the presence of a lower molecular weight component is desirable to improve processability such as in injection molding applications, but the presence of a higher molecular weight component is desirable for impact strength such as in automotive components. Balancing the low and high molecular weight components is important to tailor a polymer blend, especially an ICP, for a particular end use.

Typically, however, polyolefins having broad molecular weight distribution are processed through the use of reactor cascades where polyolefins of different molecular weights are produced in different reactors, and the polymer components later combined. Melt blending of polymer components, however, often yields poor results. Also, separately producing fractions increases production costs. Moreover, in order to ultimately obtain a polyolefin composition having broad molecular weight distribution, insufficient homogeneity of product can result.

Therefore, a need exists for methods of producing polypropylene having high stiffness and without blending polymers of different weight average molecular weights.

SUMMARY OF THE INVENTION

Provided herein are methods for producing bimodal polyolefin comprising the steps of: (1) contacting $\alpha$-olefin monomers with a catalyst in slurry polymerization conditions in the presence or absence of hydrogen to produce a high molecular weight polyolefin; and (2) contacting additional $\alpha$-olefin monomers in gas phase polymerization conditions in the presence of hydrogen and the high molecular weight polyolefin and the catalyst to produce bimodal polyolefin having a molecular weight distribution of between about 3.0 and about 40.0, a flexural modulus of at least 1500 MPa and a melt flow rate between about 50 g/10 min and about 150 g/min; wherein the amount of hydrogen present in the gas phase polymerization conditions is higher than the amount present in the slurry polymerization conditions. In any embodiment, the bimodal polyolefin can have an $M_z$ value of at least 1,000 kDa, or at least 2,000 kDa. In any embodiment, there is no venting of hydrogen between the first and second contacting steps. In any embodiment, the $\alpha$-olefin monomer can be propylene and the polyolefin can be polypropylene. In any embodiment, the methods can further comprise polymerizing the polypropylene with ethylene and propylene in a second gas phase to produce a polypropylene impact copolymer having a weight average molecular weight between about 50 kDa and 280 kDa. In any embodiment, the present methods can further comprise the step of venting the propylene monomer from the polypropylene.

Also provided are methods for producing polypropylene comprising the steps of: (1) polymerizing propylene monomer with a catalyst in a slurry to produce a high molecular weight polypropylene having a weight average molecular weight (Mw) of between about 500 kDa and 1000 kDa; and (2) reacting the catalyst and additional monomers in the presence of the high molecular weight polypropylene with hydrogen in a gas phase to produce polypropylene having a low weight average molecular weight of between about 20 kDa to 150 kDa, a molecular weight distribution of between about 3.0 and about 40.0 and a flex module of at least about 1500 MPa.

Also provided are methods for producing polypropylene comprising the steps of: (1) contacting a propylene monomer with a catalyst in a slurry polymerization reactor to produce an effluent comprising a high molecular weight polypropylene and propylene monomer, the high molecular weight polypropylene having a weight average molecular weight having a weight average molecular weight (Mw) of between about 500 kDa and 1000 kDa; and (2) feeding hydrogen and the effluent into a gas phase polymerization reactor to produce low molecular weight polypropylene having a weight average molecular weight of between about 20 kDa and about 150 kDa and a flexural modulus between about 1500 MPa and 1900 MPa, wherein a mole ratio of hydrogen to $\alpha$-olefin monomer in the gas phase is between about 0 to about 0.3.

In any embodiment, the effluent can be continuously withdrawn from the slurry polymerization reactor. In any embodiment, the method can further comprise the step of polymerizing the polypropylene with ethylene and propylene in a second gas phase polymerization reactor with hydrogen to produce an impact copolymer. In any embodiment, a second effluent can be drawn from the second gas phase polymerization reactor and the second effluent comprises the impact copolymer. In any embodiment, propylene monomer can be vented from the second effluent. In any embodiment, propylene monomer can be recycled to the slurry phase polymerization reactor. In any embodiment, the polyolefin can have a molecular weight distribution between about 4.0 to about 20.

In any embodiment, pressure of the slurry and/or the slurry polymerization reactor can be between about 430 psig to about 510 psig. In any embodiment, temperature of the slurry polymerization reactor can be between about 60° C. and about 80° C. In any embodiment, pressure of the gas phase and/or the gas phase polymerization reactor can be between about 180 psig to about 300 psig. In any embodiment, temperature of the gas phase and/or the gas phase polymerization reactor can be between about 60° C. and about 90° C. In any embodiment, reaction residence time in the slurry and/or the slurry polymerization reactor can be between about 30 minutes to about 90 minutes. In any embodiment, residence time in the gas phase and/or the gas phase polymerization reactor can be between about 30 minutes to about 180 minutes. In any embodiment, hydrogen can be fed to the gas phase polymerization reactor at a flow rate of between about 1000, or 1500, or 2000, or 2500 sccm to about 3500, or 4000, or 4500, or 5000 sccm. In any embodiment, the methods can further comprise the step of prepolymering the $\alpha$-olefin monomer and catalyst.

In any embodiment, polypropylene can have a melt flow rate (230° C./2.16 kg) within a range of from 5.0 g/10 min to 50 g/10 min. In any embodiment, the impact copolymer has a melt flow rate (230° C./2.16 kg) within a range of from 5.0 g/10 min to 50 g/10 min. In any embodiment, polypropylene has a Notched Izod impact, according to ASTM D256 at 21° C., between about 0 J/m and about 6 J/m. In any embodiment, the impact copolymer has a Notched Izod impact, according to ASTM D256 at 21° C., between about 400 J/m and about 1000 J/m.

DETAILED DESCRIPTION OF THE INVENTION

Figure 1:
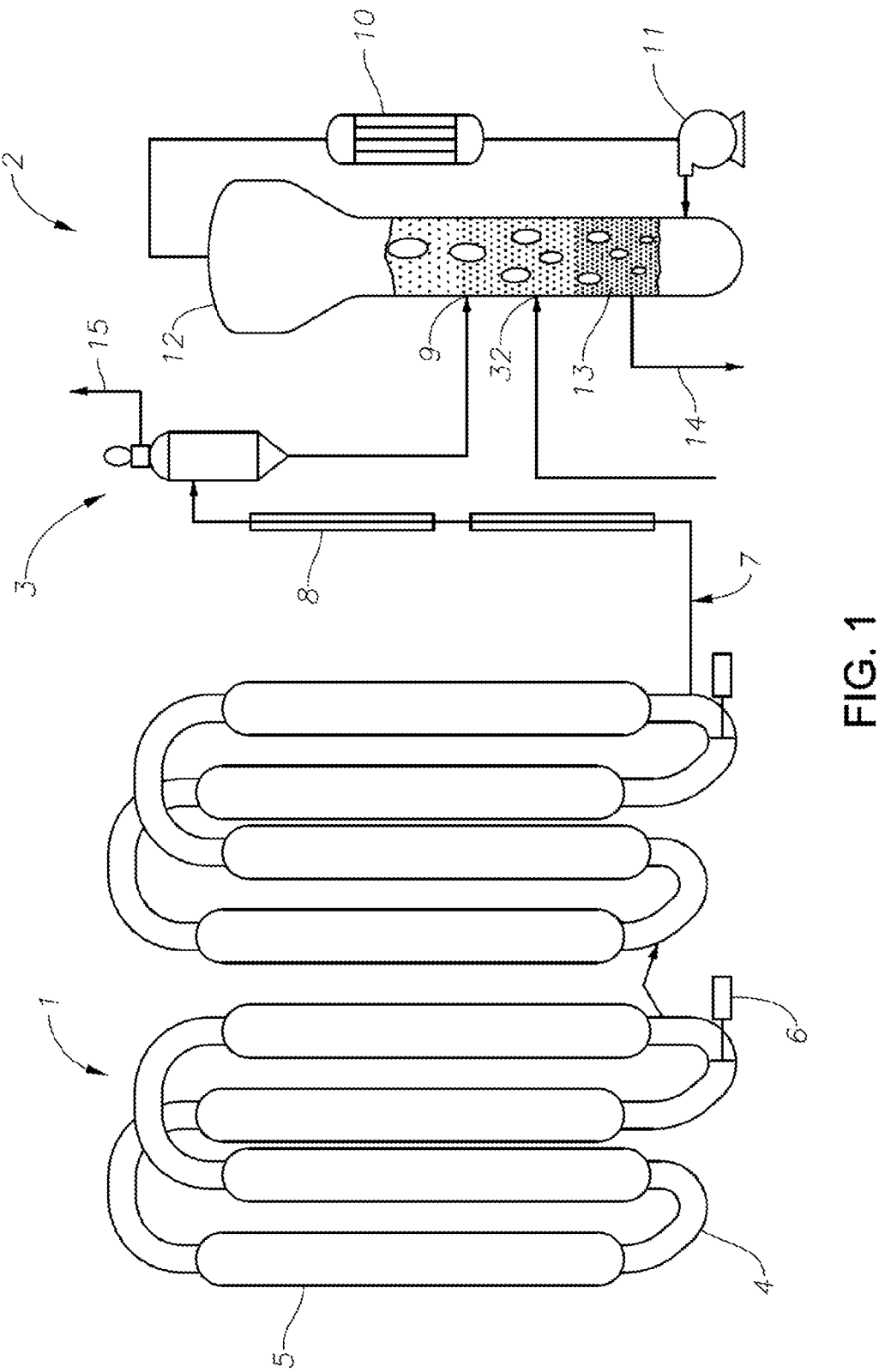
FIG. 1 is a schematic diagram of the two-stage polymerization process for producing bimodal polyolefins having high stiffness and broad molecular weight distribution.

For the purposes of this disclosure, the following definitions will apply:

As used herein, the terms "a" and "the" as used herein are understood to encompass the plural as well as the singular.

The term "density" refers to the density of a polymer independent of any additives, such as antiblocks, which may change the tested value. Density is measured in accordance with ASTM D-1505.

The term "impact copolymer," "ICP" or "polypropylene impact copolymer" or simply "impact copolymer" refers to a combination, typically heterophasic, of crystalline and amorphous polymers, such as, for example, iso-polypropylene ("iPP") and rubber, which provide the ICP with both stiffness and toughness, i.e., a stiffness greater than that of one or more of the amorphous polymer(s) and a toughness greater than that of one or more of the crystalline polymer(s). An ICP can have a morphology such that the matrix phase comprises a higher proportion of the crystalline polymer, and a rubber is present in a higher proportion in a dispersed or co-continuous phase, e.g., a blend comprising 60 to 95 wt % of a matrix of iPP, and 5 to 40 wt % of an ethylene, propylene or other polymer with a Tg of 0° C. or less.

The term "melt index" or "MI," or equivalently "melt flow rate" or "MFR," is the number of grams extruded in 10 minutes under the action of a standard load and is an inverse measure of viscosity. A high MI/MFR implies low viscosity and low MI/MFR implies high viscosity. In addition, polymers are shear thinning, which means that their resistance to flow decreases as the shear rate increases. This is due to molecular alignments in the direction of flow and disentanglements. As provided herein, MI ($I_2$, 190° C., 2.16 kg)

and MFR are determined according to ASTM D-1238-E, also sometimes referred to as $I_2$ or $I_{2.16}$.

As used herein, "$M_n$" is number average molecular weight, "$M_w$" is weight average molecular weight, and "$M_z$" is z-average molecular weight. Unless otherwise noted, all molecular weight units (e.g., $M_w$, $M_n$, $M_z$) including molecular weight data are in the unit of g·mol$^{-1}$.

Molecular Weight Distribution ("MWD") is equivalent to the expression $M_w/M_n$. The expression $M_w/M_n$ is the ratio of the $M_w$ to the $M_n$. The $M_w$ is given by:

$$M_w = \frac{\sum_i n_i M_i^2}{\sum_i n_i M_i}$$

the $M_n$ is given by $$M_n = \frac{\sum_i n_i M_i}{\sum_i n_i}$$

the $M_z$ is given by $$M_z = \frac{\sum_i n_i M_i^3}{\sum_i n_i M_i^2}$$

where $n_i$ in the foregoing equations is the number fraction of molecules of molecular weight $M_i$. Measurements of $M_w$, $M_z$, and $M_n$ are typically determined by Gel Permeation Chromatography as disclosed in 34(19) MACROMOLECULES 6812 (2001). The measurements proceed as follows. Gel Permeation Chromatography (Agilent PL-220), equipped with three in-line detectors, a differential refractive index detector ("DRI"), a light scattering (LS) detector, and a viscometer, is used. Experimental details, including detector calibration, are described in 34(19) MACROMOLECULES 6812-6820 (2001). Three Agilent PLgel 10 μm Mixed-B LS columns are used. The nominal flow rate is 0.5 mL/min, and the nominal injection volume is 300 μL. The various transfer lines, columns, viscometer and differential refractometer (the DRI detector) are contained in an oven maintained at 145° C. Solvent for the experiment is prepared by dissolving 6 grams of butylated hydroxytoluene as an antioxidant in 4 liters of Aldrich reagent grade 1,2,4-trichlorobenzene (TCB). The TCB mixture is then filtered through a 0.1 μm Teflon filter. The TCB is then degassed with an online degasser before entering the GPC-3D. Polymer solutions are prepared by placing dry polymer in a glass container, adding the desired amount of TCB, then heating the mixture at 160° C. with continuous shaking for about 2 hours. All quantities are measured gravimetrically. The TCB densities used to express the polymer concentration in mass/volume units are 1.463 g/mL at about 21° C. and 1.284 g/mL at 145° C. The injection concentration is from 0.5 to 2.0 mg/mL, with lower concentrations being used for higher molecular weight samples. Prior to running each sample, the DRI detector and the viscometer are purged. The flow rate in the apparatus is then increased to 0.5 mL/minute, and the DRI is allowed to stabilize for 8 hours before injecting the first sample. The LS laser is turned on at least 1 to 1.5 hours before running the samples. The concentration, c, at each point in the chromatogram is calculated from the baseline-subtracted DRI signal, $I_{DRI}$, using the following equation:

$$c=K_{DRI}I_{DRI}/(dn/dc),$$

where $K_{DRI}$ is a constant determined by calibrating the DRI, and (dn/dc) is the refractive index increment for the system. The refractive index, n=1.500 for TCB at 145° C. and λ=690 nm. Units on parameters throughout this description of the GPC-3D method are such that concentration is expressed in g/cm³ and intrinsic viscosity is expressed in dL/g.

Unless otherwise indicated, the distribution and the moments of molecular weight ($M_w$, $M_n$, $M_w/M_n$, etc.), the comonomer content ($C_2$, $C_3$, $C_6$, etc.), and the branching index ($g'_{vis}$) are determined by using a high temperature Gel Permeation Chromatography (Polymer Char GPC-IR) equipped with a multiple-channel band-filter based Infrared detector IR5, an 18-angle light scattering detector and a viscometer. Three Agilent PLgel 10-μm Mixed-B LS columns are used to provide polymer separation. Aldrich reagent grade TCB with 300 ppm antioxidant butylated hydroxytoluene is used as the mobile phase. The TCB mixture is filtered through a 0.1 μm Teflon filter and degassed with an online degasser before entering the GPC instrument. The nominal flow rate is 1.0 mL/min and the nominal injection volume is 200 μL. The whole system including transfer lines, columns, and detectors are contained in an oven maintained at 145° C. The polymer sample is weighed and sealed in a standard vial with 80 μL flow marker (Heptane) added to it. After loading the vial in the autosampler, polymer is automatically dissolved in the instrument with 8 mL added TCB solvent. The polymer is dissolved at 160° C. with continuous shaking for about 1 hour for most PE samples or 2 hours for polypropylene samples. The TCB densities used in concentration calculation are 1.463 g/mL at room temperature (22° C.) and 1.284 g/mL at 145° C. The sample solution concentration is from 0.2 to 2.0 mg/mL, with lower concentrations being used for higher molecular weight samples. The concentration (c) at each point in the chromatogram is calculated from the baseline-subtracted IR5 broadband signal intensity (I) using the following equation: c=βI, where β is the mass constant. The mass recovery is calculated from the ratio of the integrated area of the concentration chromatography over elution volume and the injection mass which is equal to the pre-determined concentration multiplied by injection loop volume.

The conventional molecular weight (IR MW) is determined by combining universal calibration relationship with the column calibration which is performed with a series of monodispersed polystyrene (PS) standards ranging from 700 to 10 Mg/mole (MDaltons). The MW at each elution volume is calculated with the following equation:

$$\log M = \frac{\log(K_{PS}/K)}{a+1} + \frac{a_{PS}+1}{a+1}\log M_{PS}$$

where the variables with subscript "PS" stand for polystyrene while those without a subscript are for the test samples. In this method, $a_{PS}$=0.67 and $K_{PS}$=0.000175 while "a" and "K" are calculated from a series of empirical formulae established in the literature (T. Sun, P. Brant, R. R. Chance, and W. W. Graessley, 34(19) MACROMOLECULES 6812-6820 (2001)). Specifically, the value of a/K is 0.695/0.000579 for polyethylene and 0.705/0.0002288 for polypropylene. Values for $M_n$ are ±50 Daltons (Da), and for $M_w$ are ±100 Da. Concentrations are expressed in g/cm³, molecular weight is expressed in Daltons, and intrinsic viscosity (hence K in the Mark-Houwink equation) is expressed in dL/g unless otherwise noted.

The term "olefin" refers to a linear, branched, or cyclic compound comprising carbon and hydrogen and having a hydrocarbon chain containing at least one carbon-to-carbon double bond in the structure thereof, where the carbon-to-carbon double bond does not constitute a part of an aromatic ring. The term "olefin" as used herein includes all structural isomeric forms of olefins, unless it is specified to mean a single isomer or the context clearly indicates otherwise. For example, an α-olefin monomer can refer to an α-olefin that is capable of polymerization by the insertion (Ziegler-Natta) mechanism. An α-olefin can be a compound having the structure $CH_2$=CHR, wherein R is a linear or cyclic alkyl group. Typical α-olefin monomers include propene (R=—$CH_3$), 1-butene (R=—$CH_2CH_3$), 4-methyl-1-pentene (R=—$CH_2CH(CH_3)_2$), 1-hexene (R=—$(CH_2)_3CH_3$) and 1-octene (R=—$(CH_2)_5CH_3$). In addition, an α-olefin polymer refers to an α-olefin homopolymer or copolymer. Monomers to be copolymerized can include ethylene in addition to α-olefin monomers of the above-mentioned type.

The "secant modulus" is the slope of a line connecting the origin to an object's stress/strain curve at a specified strain percentage. For example, the "1% secant modulus" is the slope of a line connecting the origin to an object's stress/strain curve at 1% strain. The secant modulus describes the overall stiffness of an object. Lower strain percentages typically approximate elastic behavior more accurately. Measurements for 1% secant modulus can be made by following the procedure of ASTM D790A.

A "separation," "separator" or "separation step," includes a process or method of separating unreacted olefin monomer from polyolefin that has formed, for example, from a polymerization medium, such as by physical separation and/or separation by heating and/or pressure changes to the mixture, and refers to the separation of propylene from forming polypropylene, ethylene-propylene copolymer and/or impact copolymer.

The term "polymer" refers to a polyolefin having two or more of the same or different "mer" units. A "homopolymer" is a polymer having mer units that are the same. A "copolymer" is a polymer having two or more mer units that are different from each other. A "terpolymer" is a polymer having three mer units that are different from each other. "Different" in reference to mer units indicates that the mer units differ from each other by at least one atom or are different isomerically.

As used in slurry polymerization, the term "polymerization medium" refers to a mixture of liquids, gases and/or solids comprising α-olefin monomer and one or more catalyst components such as a solid Ziegler-Natta polymerization catalyst. In the slurry, polymerization medium can further include activators for the polymerization catalyst, and trace amounts of hydrogen, and one or more external electron donors.

As used in the gas phase polymerization, the term "polymerization medium" refers to polyolefin together with α-olefin monomer, one or more catalyst component, and, optionally a comonomer to produce impact copolymer as described herein.

As used herein, the terms "polymerization temperature" and "reactor temperature" are interchangeable.

The term "polypropylene" refers to both homopolymers of propylene monomer (propylene-derived units) and copolymers of propylene.

A "reactor" is any type of vessel or containment device in any configuration of one or more reactors, and/or one or more reaction zones, wherein a similar polymer is produced; however, two or more reactors that are fluidly connected with one another may each produce a different polymer.

As used herein, the terms "slurry polymerization," "slurry phase," and "in a slurry polymerization reactor" each refer to a process where an α-olefin (i.e., propylene) is partly dissolved or not dissolved in the polymerization medium. During slurry polymerization, catalyst components, solvent, α-olefins and hydrogen can be passed under pressure to one or more slurry polymerization reactors. Typically, catalyst components are fed to the slurry polymerization reactor as a mixture in aliphatic hydrocarbon solvent, in oil, a mixture thereof, or as a dry powder.

The term "gas phase polymerization reactor" refers to a gas phase reactor of the second stage of the polymerization process of the present methods. The term "second gas phase polymerization reactor" refers to an optional gas phase reactor, or polymerization process, where comonomer and polyolefin are reacted to produce impact copolymer.

As used herein, percent by mole is expressed as "mol. %," and percent by weight is expressed as "wt. %."

Provided herein are methods for producing bimodal polyolefins comprising the steps of: (1) contacting α-olefin monomers with a catalyst in slurry polymerization conditions in the presence of zero to minimum hydrogen to produce a high molecular weight polyolefin; and (2) contacting additional α-olefin monomers in gas phase polymerization conditions and the high molecular weight polyolefin and the catalyst to produce bimodal polyolefin having a molecular weight distribution of between about 3.0 and about 40.0, a flexural modulus of at least 1500 MPa and a melt flow rate between about 50 g/10 min and about 300 g/10 min. In any embodiment, the α-olefin monomer useful as a reactant is propylene and the bimodal polyolefin produced is polypropylene. Optionally, the present methods include the step of polymerizing the bimodal polyolefin with a comonomer in a second gas phase to provide an impact copolymer. In any embodiment, the α-olefin monomer can undergo a pre-polymerization step described below. In any embodiment, the effluent can be continuously or intermittently withdrawn from the slurry polymerization reactors.

There are several advantages of the present method of making bimodal polyolefins. The present method allows lower hydrogen concentration for slurry polymerization and higher hydrogen concentration for gas phase polymerization, which allows direct transfer (no need to vent and re-build reactor composition) from first step polymerization (slurry) to second step polymerization (gas). Using higher hydrogen concentration for slurry polymerization and lower hydrogen for gas phase would require a venting process between the first step polymerization (slurry phase polymerization) and second step polymerization (gas phase polymerization), which requires larger capital investment.

There is another benefit of making bimodal polypropylene and polypropylene impact copolymers with lower hydrogen concentration in the slurry phase and higher concentration of hydrogen in the gas phase versus vice versa: there is a thermodynamic limitation for highest amount of hydrogen added in the slurry phase polymerization, or the reactor would reach its bubble point and disturb normal reactor operation. Adding higher concentration of hydrogen in gas phase would not reach any thermodynamic limitation, potentially allowing for high melt flow polypropylene and impact polypropylene copolymers.

Prepolymerization

In any embodiment, prepolymerization can be continuous where a liquid phase includes α-olefin monomers (i.e., propylene) together with minor amounts of other reactants and optionally inert components dissolved therein. In any embodiment, prepolymerization can be performed in a continuous stirred tank reactor or a loop reactor. A prepolymerization reaction can be conducted at a temperature between about 0° C. and about 60° C., between about 10° C. and about 50° C., or between about 20° C. and about 45° C. Pressure of the prepolymerization reaction is not critical, but must maintain the reaction mixture in liquid phase, such as between about 275 psig and about 1435 psig, or between about 420 bar and about 1000 bar.

In a prepolymerization step, α-olefin monomers can be fed into a prepolymerization stage. The amount of prepolymer (α-olefin monomer) on a catalyst can be between about 10 g and about 1000 g per g of the solid catalyst component, or between about 50 g and about 500 g per g of the solid catalyst component. Catalyst particles can be recovered from a continuous stirred prepolymerization reactor, but may not all contain the same amount of prepolymer. Instead, each catalyst particle has its own characteristic amount of prepolymer which depends on the residence time of that particle in the prepolymerization reactor. As some particles remain in the reactor for a relatively long time and some for a relatively short time, the amount of prepolymer on different particles is different and some individual particles can contain an amount of prepolymer which is outside the above ranges.

Catalyst components can be introduced in the prepolymerization step. In any embodiment, a solid catalyst component and co-catalyst can be fed separately. For example, a first portion of cocatalyst can be introduced into the prepolymerization stage and a second portion can be fed into subsequent polymerization stages. Other components can be added in the prepolymerization stage, such as chain transfer agents, antistatic agents, promoters, scavenging agents, and the like.

In any embodiment, a catalyst can include a Ziegler-Natta catalyst, such as a catalyst that includes a solid titanium catalyst component that can include titanium as well as magnesium, halogen, at least one non-aromatic "internal" electron donor, and at least one "external" electron donors. The solid titanium catalyst component can be prepared by contacting a magnesium compound, a titanium compound, and at least the internal electron donor. Examples of the titanium compound used in the preparation of the solid titanium catalyst component include tetravalent titanium compounds having the formula $Ti(OR_n)X_{4-n}$, wherein "R" is a hydrocarbyl radical, "X" is a halogen atom, and "n" is from 0 to 4. For purposes of this disclosure, a hydrocarbyl radical is defined to be $C_1$ to $C_{20}$ radicals, or $C_1$ to $C_{10}$ radicals, or $C_6$ to $C_{20}$ radicals, or $C_7$ to $C_{21}$ radicals, any of which may be linear, branched, or cyclic where appropriate (aromatic or non-aromatic).

In any embodiment, the halogen-containing titanium compound can be a titanium tetrahalide, or titanium tetrachloride. In any embodiment, the magnesium compound used in the preparation of the solid titanium catalyst component includes a magnesium compound having reducibility (or capable of alkyl substitution) and/or a magnesium compound having no reducibility. Suitable magnesium compounds having reducibility may, for example, be magnesium compounds having a magnesium-carbon bond or a magnesium-hydrogen bond. Examples of useful magnesium compounds include dimethyl magnesium, diethyl-magnesium, dipropyl magnesium, dibutyl magnesium, diamyl magnesium, dihexyl magnesium, didecyl magnesium, magnesium ethyl chloride, magnesium propyl chloride, magnesium butyl chloride, magnesium hexyl chloride, magnesium amyl chloride, butyl ethoxy magnesium, ethyl butyl magnesium, and/or butyl magnesium halides. The Ziegler-Natta catalyst is supported by the magnesium and titanium compounds of the solid titanium catalyst component, which is the solid part of the catalyst.

In any embodiment, the Ziegler-Natta catalysts are used in combination with an activator, also referred to herein as a Ziegler-Natta activator. In any embodiment, compounds containing at least one aluminum-carbon bond in the molecule may be utilized as the activator, also referred to herein as an organoaluminum activator. Suitable organoaluminum compounds include organoaluminum compounds of the general formula $R^1_mAl(OR^2)_nH_pX_q$, wherein $R^1$ and $R^2$ are identical or different, and each represents a $C_1$ to $C_{15}$ hydrocarbyl radical (alkyl or aryl), a $C_1$ to $C_4$ alkyl; "X" represents a halogen atom; and "m" is 1, 2, or 3; "n" is 0, 1, or 2; "p" is 0, 1, 2, or 3; and "q" is 0, 1, or 2; and wherein m+n+p+q=3. Other suitable organoaluminum compounds include complex alkylated compounds of aluminum represented by the general formula $M^1AlR^1_4$, wherein $M^1$ is lithium, sodium, or potassium, and $R^1$ is as defined above. Suitable examples of the organoaluminum compounds include trialkyl aluminums such as trimethyl aluminum, triethyl aluminum and tributyl aluminum; trialkenyl aluminums such as triisoprenyl aluminum; dialkyl aluminum alkoxides such as diethyl-aluminum ethoxide and dibutyl aluminum ethoxide; alkyl aluminum sesquialkoxides such as ethyl aluminum sesquiethoxide and butyl aluminum sesquibutoxide.

Electron donors present with the metal components described above in forming the catalyst suitable for producing the polypropylenes described herein include "internal" and "external" electron donors. In any embodiment, an internal electron donor may be used in the formation reaction of the catalyst as the transition metal halide is reacted with the metal hydride or metal alkyl. Examples of suitable internal electron donors include amines, amides, ethers, esters, ketones, nitriles, phosphines, stilbenes, arsines, phosphoramides, thioethers, thioesters, aldehydes, alcoholates, and salts of organic acids, any of which may include an aromatic group. The internal electron donors can be part of the solid catalyst component, while the external electron donors can be added separately from the solid catalyst component.

In any embodiment, an internal donor can be non-aromatic. The non-aromatic internal electron donor may include an aliphatic amine, amide, ester, ether, ketone, nitrile, phosphine, phosphoramide, thioethers, thioester, aldehyde, alcoholate, carboxylic acid, or a combination thereof. In any embodiment, the non-aromatic internal electron donor includes a substituted or unsubstituted $C_4$ to $C_{10}$ or $C_{20}$ di-, tri-, or tetra-ether or glycol, a substituted or unsubstituted $C_4$ to $C_{10}$ or $C_{20}$ carboxylic acid or carboxylic acid ester that may include one or more ether groups, or a combination of two or more such compounds. By "substituted," what is meant is that the compound may include groups such as hydroxides, amines, silanes, or a combination thereof. In any embodiment, the combination of two or more compounds includes secondary or tertiary carbon atoms (thus iso- or tert-hydrocarbon compounds).

In any embodiment, at least one, and two or more external electron donors are used in combination with the solid Ziegler-Natta catalyst component, as long as one of them is an amino-silane donor. External donors can be added to the polymerization reactors as separate components along with the catalyst and activator. As used herein, an "amino-silane" donor is an external electron donor having at least one amine or alkylamine moiety and at least one silane, alkylsilane or siloxane moiety. In any embodiment, the external electron donors may include an organic silicon compound of the general formula $R^1_4Si$ and/or $R^1_nSi(NR^2_2)_{4-n}$, wherein each $R^1$ is independently selected from hydrogen, $C_1$ to $C_{10}$ linear and branched alkyls and alkenes, $C_4$ to $C_{12}$ cycloalkyls and cycloalkenes, $C_5$ to $C_{14}$ aryls, $C_6$ to $C_{20}$ alkylaryls, $C_1$ to $C_{10}$ linear or branched alkoxys, $C_4$ to $C_{12}$ cycloalkoxys, $C_5$ to $C_{14}$ aryloxys, and $C_6$ to $C_{20}$ alkylaryloxys; each $R^1$ is independently selected from $C_1$ to $C_6$ linear, branched and cyclic alkyls or alkoxys; and each $R^2$ is independently selected from hydrogen, $C_1$ to $C_{10}$ linear and branched alkyls and alkenes, $C_4$ to $C_{12}$ cycloalkyls and cycloalkenes, $C_5$ to $C_{14}$ aryls, and $C_6$ to $C_{20}$ alkylaryls; each $R^2$ is independently selected from $C_1$ to $C_5$ linear or branched alkyls; and wherein "n" is 0, 1, 2, or 3.

Examples of the suitable organosilicon and/or amino-silane compounds include dimethylamino-triethoxysilane, diethylamino-triethoxysilane, vinylethylamino-triethoxysilane, dipropylamino-triethoxysilane, dimethylamino-trimethoxysilane, dimethylamino-tripropylsilane, diethyl-amino-dicyclopentylmethoxysilane, diethylamino-dimethoxy-cyclohexylsilane, dipropylamino-vinyldimethoxysilane, trimethylmethoxysilane, trimethylethoxysilane, dimethyldimethoxysilane, dimethyl-dimethoxysilane, dimethyldiethoxysilane, diisopropyldiethoxysilane, t-butylmethyl-n-diethoxysilane, t-butylmethyldiethoxysilane, t-amylmethyldiethoxysilane, diphenyldimethoxysilane, phenylmethyldimethoxysilane, diphenyldiethoxysilane, bis-o-tolyldimethoxysilane, bis-m-tolyldimethoxysilane, bis-p-tolyldimethoxysilane, bis-p-tolyldimethoxysilane, bisethylphenyldimethoxysilane, dicyclohexyldiethoxysilane, cyclohexylmethyldimethoxysilane, cyclohexylmethyldiethoxysilane, ethyltrimethoxysilane, ethyltriethoxysilane, vinyltrimethoxysilane, methyltrimethoxysilane, n-propyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, t-butyltriethoxysilane, n-butyltriethoxysilane, isobutyltriethoxysilane, phenyltriethoxysilane, γ-aminopropyltriethoxysilane, chlorotriethoxysilane, vinyltributoxysilane, cyclohexyltrimethoxysilane, cyclohexyltriethoxysilane, 2-norbornanetriethoxysilane, 2-norbornanemethyldimethoxysilane, ethylsilicate, butylsilicate, trimethylphenoxysilane, methylallyloxysilane, vinyltris(β-methoxyethoxysilane), vinyltriacetoxysilane, dimethyltetraethoxydisiloxane, tetraethoxysilane, methylcyclohexyldimethoxysilane, propyltriethoxysilane, and/or dicyclopentyldimethoxysilane.

In any embodiment, the external electron donor consists of only one or more amino-silane donors. Different external electron donors may be added in the first and/or second or more loop reactors to effect the polypropylene properties such as making the polypropylene bimodal in MFR, molecular weight, crystallinity, or some other property. In any embodiment, one external electron donor is added throughout, and at the same concentration. In any embodiment, the combined concentration of external electron donors can be present with the catalyst and olefin monomer(s) in the reactor between about 5 ppm, about 10 ppm, about 20 ppm to about 80, about 100, or about 120 ppm, based on the total olefin concentration.

The concentration of the Ziegler-Natta catalyst in the polymerization system can be 2 ppm, 4 ppm, 8 ppm to 20 ppm, 40 ppm, 60 ppm, or 100 ppm based on the total olefin concentration. The organoaluminum activator is present in an amount sufficient to produce between about 0.1 g and about 500 g, or between about 0.3 g and about 300 g of a polypropylene per gram of the titanium catalyst present, and can be present in an amount between about 0.1 moles and about 100 moles, or between about 0.5 moles and about 50 moles, per mole of the titanium atom present in the catalyst component. Stated another way, the organoaluminum activator can be added in the amount of about 10 ppm, about 20 ppm, about 40 ppm to about 80 ppm, about 100 ppm, about 140 ppm, about 180 ppm, or about 200 ppm based on the total olefin concentration.

Slurry Polymerization

The present methods include slurry polymerization. In a slurry, α-olefins are polymerized to produce polyolefins. In the slurry polymerization reactor, polyolefin particles are formed and suspended in α-olefin monomer as well as catalyst that is fragmented and dispersed within the polyolefin particles. During slurry polymerization, the slurry is agitated to enable the transfer of reactants from a polymerization medium into the polyolefin particles.

Slurry polymerization is referred to sometimes as "bulk polymerization," or a "bulk slurry." Slurry polymerization is conducted in liquid α-olefin monomer with or without an inert diluent. In any embodiment, α-olefin monomers used in commercial production can contain some fraction of aliphatic hydrocarbons as impurities. For example, the α-olefin monomer can contain up to 5% of propane as an impurity. The α-olefin monomer is polymerized in the slurry polymerization reactor. Unreacted α-olefin monomer can be recycled from the effluent of the slurry polymerization reactor and recycled. Further, inert components can accumulate during slurry polymerization. Therefore, the effluent of the slurry polymerization reactor can comprise up to 40 wt % of inert components. It is to be understood, however, that such a process is still within the meaning of "slurry polymerization."

In the present methods, the temperature of the slurry can be between about 60° C. to about 80° C., between about 62° C. to about 78° C., or between about 65° C. to about 75° C. and the pressure of the slurry polymerization reactor is typically between about 430 psig to about 580 psig, between about 430 psig to about 550 psig, or between about 430 psig to about 510 psig. In some cases, slurry polymerization can be performed at a temperature which is higher than the critical temperature of the polymerization medium. Such reaction conditions can be referred to as "supercritical conditions." The phrase "supercritical fluid" is used to denote a fluid or fluid mixture at a temperature and pressure exceeding the critical temperature and pressure of said fluid or fluid mixture.

The slurry polymerization reactor can be any known reactor used for polymerization of α-olefin monomer. The slurry polymerization reactor can be a continuous stirred tank reactor, a loop reactor, and the like. In any embodiment, slurry polymerization can be performed in a loop reactor in which a slurry is circulated with high velocity along a closed pipe by a circulation pump. Examples of loop reactors are disclosed in U.S. Pat. Nos. 4,582,816, 3,405,109, 3,324,093, EP 479186, and U.S. Pat. No. 5,391,654.

As described herein, a slurry can be withdrawn from the reactor either continuously or intermittently. Intermittent withdrawal can include the use of settling legs where the solids concentration of the slurry is allowed to increase before withdrawing a batch of the concentrated slurry from the reactor. The use of settling legs is disclosed in, for example, U.S. Pat. Nos. 3,374,211, 3,242,150, and EP 1310295. Continuous withdrawal is disclosed in, for example, EP 891990, EP 1415999, EP 1591460, and EP 1860125. In any embodiment, continuous withdrawal methods can be combined with a suitable concentration method, such as those disclosed in EP 1860125 and EP 1591460.

In any embodiment, the present methods include two-step or two-stage polymerization. The first step or first stage is slurry polymerization in the slurry polymerization reactor. The second step or second stage is gas phase polymerization in a gas phase polymerization reactor. Two-stage polymerization can be referred to as sequential polymerization. Here, polymerization of α-olefin monomer is continued in gas phase polymerization (in a gas phase polymerization reactor as described immediately below). More specifically, in the present methods, the effluent from the slurry polymerization reactor comprising polyolefin is fed to the gas phase polymerization reactor. Other processes utilizing sequential polymerization are described, for example, in EP 887379, EP 887380, EP 887381, and EP 991684. Furthermore, as described herein, the processing between slurry polymerization and gas phase polymerization can be continuous and without venting hydrogen between the slurry polymerization reactor and the gas phase polymerization reactor.

In any embodiment, the slurry has a molar ratio of hydrogen to α-olefin monomer between about 0 and about 0.003, between about 0 and about 0.0028, between about 0 and about 0.0026, between about 0 and about 0.0024, between about 0 and about 0.0022, or between about 0 and about 0.002. In any embodiment, a mole ratio of hydrogen to α-olefin monomer in the gas phase polymerization conditions is greater than a mole ratio of hydrogen to α-olefin monomer in the slurry polymerization conditions. Equivalently, the amount of hydrogen present in the gas phase polymerization conditions is higher than the amount present in the slurry polymerization conditions. In addition, other process additives can also be introduced into the slurry polymerization reactor to facilitate a stable operation of the process such as chain transfer agents, antistatic agents, antifouling agents, scavengers, and the like.

Gas Phase Polymerization Reactor—Fluidized Bed Reactors

As described above, the subject methods include a second step of gas phase polymerization carried out in sequence with slurry polymerization. In any embodiment, the polymerization reaction started in the slurry polymerization reactor continues in a gas phase polymerization reactor in the presence of a polymerization catalyst.

In any embodiment, antistatic agents can be introduced into the gas phase polymerization reactor if needed. Suitable antistatic agents and methods to use them are disclosed, for example, in U.S. Pat. Nos. 5,026,795, 4,803,251, 4,532,311, 4,855,370, and EP 560035. Antistatic agents can include polar compounds such as water, ketones, aldehydes, alcohols, and the like.

Figure 2:
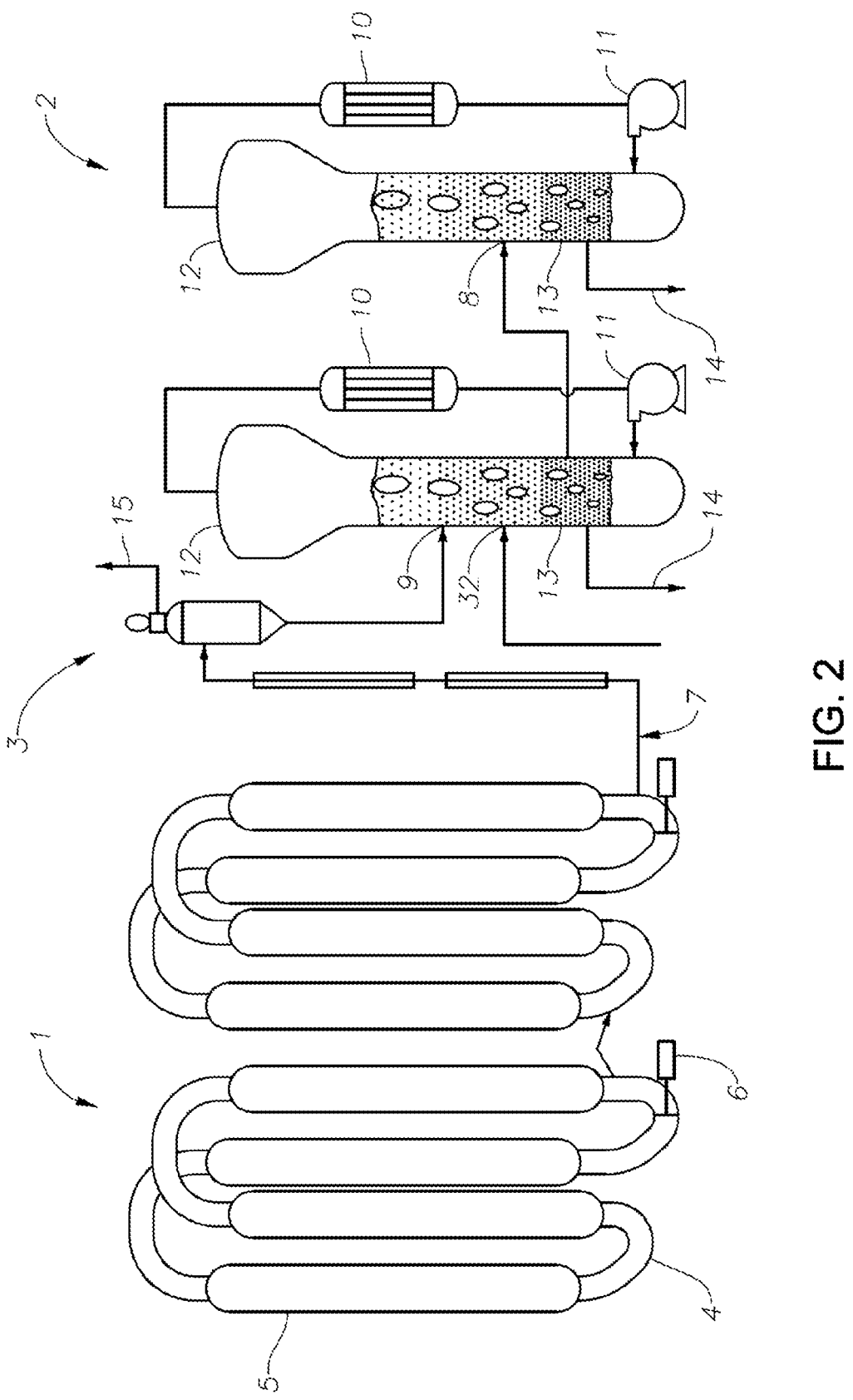
FIG. 2 is a schematic diagram of a polymerization process for producing impact copolymers having high stiffness and broad molecular weight distribution.
Figure 3:
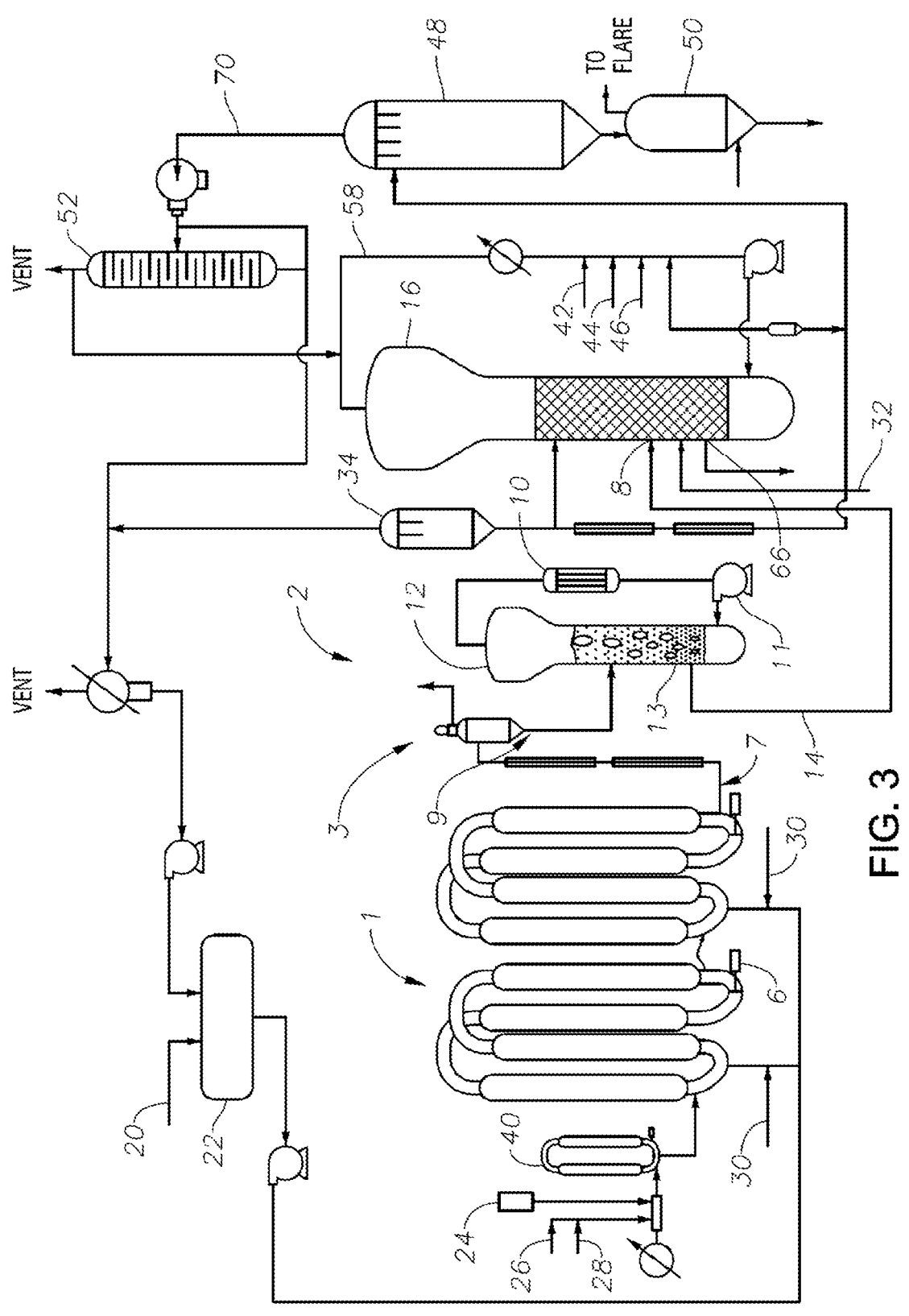
FIG. 3 is a schematic diagram of a polymerization process to produce polypropylene-based bimodal polypropylene and impact copolymers having high stiffness and broad molecular weight distribution.

Polyolefin particles generated in the gas phase polymerization reactor can be fluidized with the help of a fluidization gas that includes olefin monomer, comonomer(s), inert gas, and the like. As shown in FIGS. 1, 2, and 3, the polymerization medium is introduced into an inlet chamber at the bottom of the gas phase polymerization reactor. In any embodiment, gas phase polymerization reactor can contain a fluidized bed that includes growing polyolefin particles containing the active catalyst that are located above a fluidization grid. To ensure that gas flow is uniformly distributed over the cross-sectional surface area of the inlet chamber, an inlet pipe can be equipped with a flow dividing element as disclosed in, for example, U.S. Pat. No. 4,933, 149 and EP 684871.

From the inlet chamber, gas flow within the gas phase polymerization reactor is passed upwards through a fluidization grid into the fluidized bed. The purpose of the fluidization grid is to divide the gas flow evenly through the cross-sectional area of the fluidized bed. In any embodiment, the fluidization grid can be arranged to establish a gas stream to sweep along the reactor walls, as disclosed, for example, in WO 05/087361. Other types of fluidization grids are disclosed, for example, in U.S. Pat. No. 4,578,879, EP 600414, and EP 721798. An overview of fluidization bed reactor function is described by Geldart & Bayens, *The Design of Distributors for Gas fluidized Beds,* 42 POWDER TECHNOLOGY (1985).

When fluidization gas is contacted with the bed containing active catalyst, the reactive components of the gas (i.e., α-olefin monomers and polyolefins) will react in the presence of the catalyst to produce the low molecular weight polyolefin. Fluidized gas is primarily heated via the exothermic reaction.

Unreacted fluidization gas can be removed from the top of the reactor and cooled in a heat exchanger to remove the heat of reaction. Unreacted fluidized gas is cooled to a temperature which is lower than that of the bed to prevent the bed from heating because of the reaction. It is possible to cool the gas to a temperature where a part of it condenses. When the liquid droplets enter the reaction, they are vaporized. Vaporization heat contributes to the removal of the reaction heat. This kind of operation is called condensed mode and variations of it are disclosed, for example, in WO 2007/025640, U.S. Pat. No. 4,543,399, EP 699213, and WO 94/25495. In any embodiment, condensing agents can be added to a recycle gas stream, as disclosed in EP 696293. The condensing agents can include non-polymerizable components, such as n-pentane, isopentane, n-butane or isobutane, and the like.

Following recovery from a heat exchanger, as shown in FIGS. 1, 2 and 3, unreacted fluidized gas can be compressed and recycled into the inlet chamber of the reactor. Prior to the entry into a gas phase polymerization reactor, fresh reactants can be introduced into the fluidization gas stream to compensate for the losses caused by the reaction and product withdrawal. The composition of the fluidization gas can be analyzed and used to determine whether additional gas components should be added to maintain the desired reaction conditions.

Catalyst can be introduced into the reactor in various ways, either continuously or intermittently, as discussed, for example, in WO 01/05845 and EP 499759. Where the gas phase polymerization reactor is a part of a reactor cascade, catalyst can be dispersed within the polyolefin particles from a preceding polymerization stage. Polyolefin particles can be introduced into the gas phase polymerization reactor as disclosed in EP 1415999 and WO 00/26258. For example, if a preceding reactor is a slurry reactor, the slurry reactor effluent can be fed directly to the fluidized bed of the gas phase polymerization reactor as disclosed amongst others in EP 887379, EP 887380, EP 887381, and EP 991684.

Polyolefin can be withdrawn from the gas phase polymerization reactor either continuously or intermittently. Combinations of these methods can also be used. By way of example, continuous withdrawal is disclosed in WO 00/29452 and intermittent withdrawal is disclosed in U.S. Pat. No. 4,621,952, EP 188125, EP 250169 and EP 579426.

More specifically, the gas phase polymerization reactor can further include a disengagement zone in which the diameter of the reactor is increased to reduce the gas velocity and allow the particles that are carried from the bed with the fluidization gas to settle back to the bed. Further, a level of the fluidized bed in the gas polymerization reactor can be observed by different techniques. For instance, the pressure difference between the bottom of the reactor and a specific height of the bed can be recorded over the whole length of the reactor and the bed level calculated based on the pressure difference values in order to determine a time-averaged level. In any embodiment, the level of the fluidized bed can be monitored by ultrasonic sensors or radioactive sensors. Here, instantaneous levels can be obtained, which can then be averaged over time to obtain a time-averaged bed level. In addition, gas phase polymerization reactors can include a mechanical agitator to facilitate mixing within the fluidized bed. An example of suitable agitator design is given in EP 707513.

Gas phase polymerization can also be conducted in a "fast fluidized bed reactor" in which the velocity of the fluidization gas exceeds the onset velocity of pneumatic transport. Then the whole bed is carried by the fluidization gas. The gas transports the polyolefin particles to a separation device, such as cyclone, where the gas is separated from the polyolefin particles.

Polyolefin is transferred to a subsequent reaction zone, such as a settled bed or a fluidized bed or another fast fluidized bed reactor. The gas, on the other hand, is compressed, cooled and recycled to the bottom of the fast fluidized bed reactor. Polyolefin can be transferred from the riser (operated in fast fluidized mode) into a downcomer (operated as settled bed) and fluidizing gas is then directed to compression and cooling as described above. The combination of fast fluidized bed and settled bed is disclosed, for example, in WO 97/04015, WO 06/022736 and WO 06/120187.

Gas Phase Polymerization Reactor—Settled Bed

Gas phase polymerization can also be performed in a settled bed. In the settled bed polyolefin flows downward in a plug flow manner in an environment containing reactive components in gaseous phase. The polyolefin powder is introduced into the bed from the top from where it flows downwards due to gravity. In an embodiment, reactants, such as monomers and comonomers, can be introduced at any point of the reactor. However, where the gas flows upwards its velocity should not exceed the minimum fluidization velocity as otherwise no downward flow of powder would be obtained. A gas buffer can be located at the top of the reactor so that reaction gas from previous polymerization zones contained in the polyolefin powder would be removed to the extent possible. The temperature of the settled bed can be controlled by adjusting the temperature and ratio of the reactant and/or inert gases introduced into the settled bed zone.

The settled bed polymerization zone can be combined with a fluidized bed polymerization zone or fast fluidized bed reaction zone. Thus, polyolefin can be introduced into the top of the settled bed zone from a fluidized bed zone or a fast fluidized bed zone. The polyolefin can be withdrawn from the bottom of the settled bed polymerization zone and recycled into the fluidized bed polymerization zone or fast fluidized bed polymerization zone. Polymerization in a settled bed is disclosed, for example, in EP 1633466, EP 1484343 and WO 97/04015.

In the present methods, hydrogen is used in the gas phase polymerization reactor as a chain transfer agent to control the molecular weight of the polyolefin.

FIGS. 1, 2 and 3 are each a schematic diagram depicting various aspects of the present methodologies as implemented in polymerization processes and various apparatus. For example, FIG. 1 shows a two-stage polymerization process including a slurry polymerization reactor 1 and a gas phase polymerization reactor 2. In a first stage, slurry polymerization of α-olefin monomer produces a high molecular polyolefin. In a second stage, gas phase polymerization of the high molecular weight polyolefin combined with hydrogen and optionally additional comonomer to produce a low molecular weight polyolefin having a weight average molecular weight of at least 19, a molecular weight distribution of between about 4 and about 20, and a melt flow rate of between about 0 g/10 min and about 300 g/10 min. Between the first stage and the second stage, hydrogen is not vented from the high molecular weight polyolefin. In any embodiment, in gas phase polymerization, the molar ratio of hydrogen to α-olefin monomer is between about 0.02 to about 0.50, between about 0.025 to about 0.45, between about 0.03 to about 0.4, between about 0.035 to about 0.35, between about 0.04 to about 0.35, between about 0.045 to about 0.3, or between about 0.05 to about 0.3. In any embodiment, a mole ratio of hydrogen to α-olefin monomer in the gas phase polymerization conditions is greater than a mole ratio of hydrogen to α-olefin monomer in the slurry polymerization conditions. Equivalently, the amount of hydrogen present in the gas phase polymerization conditions is higher than the amount present in the slurry polymerization conditions. In any embodiment, residence time in the slurry polymerization reactor is between about 30 minutes to about 120 minutes, between about 35 minutes to about 110 minutes, or between about 40 minutes to about 100 minutes. In any embodiment, residence time in each of the gas phase polymerization reactor is between about 30 minutes to about 240 minutes, between about 40 minutes to about 220 minutes, or between about 50 minutes to about 200 minutes.

As shown in FIG. 1, the slurry polymerization reactor 1 is fluidically connected to the gas phase polymerization reactor 2. In any embodiment and as shown, the slurry polymerization reactor can be a slurry loop reactor. Also as shown, each loop 4 can have a heat removal jacket 5. In the slurry polymerization reactor 1, an effluent 7 comprises low molecular weight polyolefin, α-olefin monomer, catalyst and possible trace amounts of hydrogen in an amount between about 0.001 to 0.03 mole ratio. The effluent 7 can be continuously fed to the gas phase polymerization reactor 2. Further, liquid α-olefin monomer (i.e., pure propylene) or α-olefin monomer in solution (i.e., propylene with a diluent) can be recycled to the slurry polymerization reactor 1 using at least one slurry polymerization reactor pump 6.

Optionally in any embodiment and as shown in FIGS. 1 & 2, unreacted olefin monomer can be separated from the effluent 7 through a separator 3. In any embodiment, the effluent 7 can be fluidically connected to the separator 3. In the separator 3, the effluent 7 can separate into a light component stream 15 of unreacted monomer, and a heavy component stream 9 comprising high molecular weight polyolefin and unreacted catalyst. Liquid α-olefin monomer can be vented until the α-olefin monomer is in gaseous form. In any embodiment, α-olefin monomer can be fed to gas phase polymerization reactor 2, including unreacted α-olefin monomer recycled from the separator 3.

Following optional separation, as shown in FIG. 1, high molecular weight polyolefin is fed to the inlet 9 of the gas phase polymerization reactor 2 and hydrogen is injected into the gas phase polymerization reactor at a hydrogen injection site 32. As depicted in FIGS. 1, 2 and 3, in any embodiment, the gas phase polymerization reactor 2 can be a vertical, cylindrical fluidized bed reactor having an expansion zone 12 above a fluidized bed 13. In the gas phase polymerization reactor 2, during polymerization, a polymerization medium flows into expansion zone 12. Optionally, a recycle stream taken from the top of the gas phase polymerization reactor is fluidically connected to a cooler 10 and fed to the gas phase polymerization reactor via a compressor 11. Following polymerization, polypropylene can be discharged from the gas phase polymerization reactor outlet 14.

Alternatively, as an option and as shown in FIGS. 2 & 3, polyolefin can be fed to an inlet 8 of a second gas phase polymerization reactor to produce impact copolymer. FIG. 2 shows an exemplary polymerization process for producing impact copolymer. Polyolefin is fed to the inlet 8 of a second gas phase polymerization reactor 16. Polyolefin is combined with olefin monomer and comonomer to generate an impact copolymer. The inlet of the second gas phase polymerization reactor 8 is not limited to the variation shown in FIG. 2 and may be placed in any suitable location. Following polymerization, the impact copolymer is discharged from the outlet 18 from the second gas phase polymerization reactor 16.

FIG. 3 is another schematic of a polymerization process implementing the present methodologies. With reference to FIG. 3, an α-olefin monomer feed 20 of propylene from a feed tank 22 is fed to the slurry polymerization reactor with a circulating flow of propylene and polymerization medium therein driven by pumps. Alternatively, this α-olefin monomer and polymerization medium are fed into a pre-polymerization reactor 40 via feed line 24, the catalyst via an external donor feed line 26, and the activator via feed line 28. The polymerization medium can comprise hydrogen in an amount of between about 0 mppm and about 10000 mppm based on the amount of α-olefin monomer feed under reactor temperature and pressure, where the bubble point of the system cannot be reached.

As described herein, high molecular weight polypropylene is continuously drawn from the slurry polymerization reactor 1 and optionally separated from propylene monomer. The propylene monomer can recycle to a tank 22. A transfer line dryer (not shown) can heat the recycle to a temperature to effect vaporization of the olefin (and any optional solvent), but low enough to maintain the integrity of the polyolefin therein, such as polypropylene, such as to keep the polypropylene from becoming sticky and thus fouling the lines, such as a temperature within a range from 50° C. to 120° C., or from 40° C. to 140° C.

In any embodiment, as shown in FIG. 3, polypropylene produced can be fed to the second gas phase polymerization reactor 16 through line 64 as shown in FIG. 3 forming propylene-based impact copolymer. To form impact copolymer, bimodal polyolefin from the second separator 34 can be fed to the second gas phase polymerization reactor 16 fluidly connected to gas phase polymerization reactor 2. Hydrogen, ethylene and additional propylene (if necessary) are fed through lines 42, 44 and 46. In any embodiment, an ethylene-comonomer-to-propylene ratio in the second gas phase polymerization reactor 16 can be between about 0.2 and about 0.8, between about 0.2 and about 0.6, or between about 0.2 and about 0.4. In any embodiment, operating temperatures for gas phase polymerization can be between about 60° C. and 100° C., between about 60° C. and 95° C., or between about 60° C. and 90° C. In any embodiment, operating pressure for gas phase polymerization can be between about 150 psig and about 350 psig, between about 165 psig and about 325 psig, or between about 180 psig and about 300 psig.

Through the optional step, ethylene-propylene copolymer can be formed using the same catalyst and external donor in the presence of polypropylene. Ethylene-propylene copolymer forms within the interstitial pockets and pores of the polypropylene particles and a heterogeneous solid mixture comprising a continuous phase of polypropylene and domains of ethylene-propylene copolymer is provided. Impact copolymer can be withdrawn from the second gas phase polymerization reactor at a second gas phase polymerization reactor outlet 66 and fed into line 60 for α-olefin monomer-polyolefin separation and finishing.

Further, the impact copolymer can be recycled 58 to the second gas phase polymerization reactor for further processing of impact copolymer particles. When the particles are a desirable size, impact copolymer can be transferred to a third separator 48, such as a long-retention-time dust collector, to further separate olefin from polymer. Both the third separator 48 and a purge bin 50 can be fitted with a probe(s) such as a nuclear density probe(s) to determine the level of polyolefin therein. Impact copolymer product is discharged at outlet 54 for further processing, such as by extrusion, to form pellets of material.

Also, as shown in FIG. 3, α-olefin monomer (propylene) removed from the second separator 48 can flow to a distillation apparatus 56 (or other separation device) to separate ethylene from propylene and/or other olefins as necessary. The distillation apparatus 46 can be vented or recycled to the second gas phase polymerization reactor 16, or recycled to the feed tank 22 as shown.

Noteworthily, certain process details provided in FIGS. 1, 2 and 3, such as the compressors and pumps, are for illustrative purposes only and the apparatus and/or the process is not limited by the type of compressors and pumps used to facility and maintain flow of the polymerization medium, monomers, and separated polyolefins and gas.

In any embodiment, polypropylene produced by the present methods can have a melt flow rate at 230° C., 2.16 kg, as calculated according to ASTM 1238, between about 0 g/10 min. and about 300 g/10 min., between about 50 g/10 min. and about 250 g/10 min., between about 75 g/10 min. and about 200 g/10 min., between about 100 g/10 min. and about 150 g/10 min, or between about 5.0 g/10 min. and about 50 g/10 min. In any embodiment, impact copolymer can have a melt flow rate at 230° C., 2.16 kg, as calculated according to ASTM 1238, between about 0 g/10 min. and about 150 g/10 min., between about 30 g/10 min. and about 120 g/10 min., between about 50 g/10 min. and about 100 g/10 min, or between about 5.0 g/10 min. and about 50 g/10 min. In any embodiment, polypropylene or ICP produced by the present methods can have a density within a range from 0.88 to 0.9, or 0.91 g/cm$^3$.

In any embodiment, polypropylene produced by the present methods can have a Notched Izod impact, according to ASTM D256 at 21° C., between about 0 J/m and about 10 J/m, between about 2 J/m and about 8 J/m, or between about 4 J/m and about 6 J/m. In any embodiment, impact copolymer can have a Notched Izod impact, according to ASTM D256 at 21° C., between about 0 J/m and about 1,000 J/m, between about 200 J/m and about 1,000 J/m, or between about 400 J/m and about 1,000 J/m.

In any embodiment, polypropylene produced by the methods described herein can have a weight average molecular weight as measured by GPC-DRI between about 20 kDa and about 2,000 kDa, between about 20 kDa and about 1,500 kDa, between about 20 kDa and about 1,000 kDa, or between about 20 kDa and about 500 kDa. In any embodiment, polypropylene produced with the present methods can have a polydispersity index, or ratio of weight average molecular weight to number average molecular weight ($M_w/M_n$), as measured by GPC-DRI, between about 3 and about 40, between about 3.5 and about 30, or between about 4 and about 20.

Polyolefins produced by the present methods have a bimodal molecular weight distribution with more than one peak or inflection point. As such, the polyolefins produced by the present methods comprise a high molecular weight polyolefin and a low molecular weight polyolefin. In any embodiment, the high molecular weight polyolefin has a weight average molecular weight as measured by GPC-DRI between about 400 kDa and about 2,000 kDa, between about 420 kDa and about 1,800 kDa, between about 440 kDa and about 1,600 kDa, between about 460 kDa and about 1,400 kDa, between about 480 kDa and about 1,200 kDa or between about 500 kDa and about 1,000 kDa. In any embodiment, the low molecular weight polyolefin has a weight average molecular weight, as measured by GPC-DRI, between about 20 kDa and about 200 kDa, between about 20 kDa and about 190 kDa, between about 20 kDa and about 180 kDa, between about 20 kDa and about 170 kDa, between about 20 kDa and about 160 kDa, or between about 20 kDa and about 150 kDa.

In any embodiment, impact copolymer produced with the present methods has a weight average molecular weight, as measured by GPC-DRI, between about 50 kDa and about 500 kDa, between about 50 kDa and about 445 kDa, between about 50 kDa and about 390 kDa, between about 50 kDa and about 335 kDa, or between about 50 kDa and about 280 kDa. In any embodiment, impact copolymer produced with the present methods has a polypropylene matrix having a polydispersity index, or ratio of weight average molecular weight to number average molecular weight ($M_w/M_n$), as measured by GPC-DRI that ranges between about 3 and about 40, between about 3.5 and about 30, or between about 4 and about 20.

Additional features of the inventive methods are described in the following non-limiting examples.

EXAMPLES

Generally, polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/mL at room temperature (22° C.) and 1.324 g/mL at 135° C. The injection concentration can range from 1.0 to 2.0 mg/mL, with lower concentrations being used for higher molecular weight samples.

Prior to running each sample, the DRI detector and the injector are purged. Flow rate in the apparatus is then increased to 0.5 mL/minute, and the DRI allowed to stabilize for 8 to 9 hours before injecting the first sample. The LS laser is turned on 1 to 1.5 hours before running samples.

Melt Flow Rate (MFR): MFR was measured as per ASTM D1238, condition L or ISO 1133B at 230° C. and 2.16 kg load using a melt indexer. The "Melt Index", such as for the plastomer in the compositions, is tested similarly at 190° C.

Flexural Modulus: The flexural modulus was measured according to ASTM D790, using a crosshead speed of 1.27 mm/min, and a support span of 50 mm using an Instron machine. The flexural modulus chord was measured as per ISO 178 test method, at a crosshead speed of 2 mm/min and 64 mm support span using an Instron machine.

Tensile Strength: The tensile strength at yield, elongation at yield and elongation at break were measured as per ASTM D638 or ISO 527, with a crosshead speed of 50 mm/min, using an Instron Machine.

Gel Permeation Chromatography: Polymer molecular weight (weight-average molecular weight, $M_w$, number-average molecular weight, $M_n$, and z-averaged molecular weight, $M_z$) and molecular weight distribution ($M_w/M_n$) are determined using Size-Exclusion Chromatography ("GPC"). Equipment consists of a High Temperature Size Exclusion Chromatograph (either from Waters Corporation or Polymer Laboratories), with a differential refractive index detector (DRI), an online light scattering detector, and a viscometer. Three Polymer Laboratories PLgel 10 mm Mixed-B columns are used. The nominal flow rate is 0.5 cm³/min and the nominal injection volume is 300 µL. The various transfer lines, columns and differential refractometer (the DRI detector) are contained in an oven maintained at 135° C. Solvent for the SEC experiment is prepared by dissolving 6 grams of butylated hydroxy toluene as an antioxidant in 4 liters of reagent grade 1,2,4-trichlorobenzene (TCB). The TCB mixture is then filtered through a 0.7 µm glass pre-filter and subsequently through a 0.1 µm Teflon filter. The TCB is then degassed with an online degasser before entering the SEC.

Example I

Lab Scale Synthesis of Traditional Polypropylene Produced in a Slurry

On a laboratory scale, we established a "traditional" polypropylene polymerization process in a slurry in order to provide comparative polypropylene. In this process, $N_2$ was used to purge a 2 liter ("2 L") slurry polymerization reactor. Certain operating parameters were then used in the 2 L slurry polymerization reactor as provided in Table 1 to produce comparative polypropylene ("PP").

TABLE 1

Traditional Polypropylene Production in a Slurry

| Catalyst | Ziegler Natta |
| --- | --- |
| Catalyst Amount, grams | 0.15 |
| TEAL (1M in hexane), mL | 2 |
| Donor | Mixed |
| Donor (0.1M in hexane), mL | 2 |
| Hydrogen, sccm, 1 atm, 70° C. | 3500 |
| Propylene, mL, 70° C., 650 psi | 1200 |
| Temperature, ° C. | 70 |
| Run Time, min | 60 |

More specifically, in this traditional slurry, once purged with nitrogen, a mixed external electron donor (DCPMS and PTES), and co-catalyst tetraethyl aluminum (TEAL) were added to the slurry phase reactor. Hydrogen was then added. To start the reaction, catalyst and propylene were added. Polymerization of the propylene monomer was performed at a temperature between about 60° C. and about 80° C. for about 60 min. The polymerization reaction was then stopped by cooling the 2 L slurry polymerization reactor and propylene monomer was vented.

Lab Scale Synthesis of Impact Copolymer

In another lab synthesis, and in order to produce comparative impact copolymers, the slurry polymerization described immediately above was performed. Propylene monomer was vented from the slurry polymerization reactor and pressurized so to provide propylene feed to a gas phase polymerization reactor. Ethylene was then added to a gas phase polymerization reactor and the gas mole ratio of propylene and ethylene were controlled to provide an ethylene-propylene rubber or impact copolymer.

Table 2 provides our experimental details for the production of "traditional" impact copolymers.

TABLE 2

Traditional Impact Copolymer Production

| Slurry Polymerization | |
| --- | --- |
| Catalyst | Ziegler Natta |
| Catalyst Amount, gram | 0.15 |
| TEAL, mL | 2 |
| Donor | mixed |
| Donor, mL | 2 |
| Hydrogen, sccm, 1 atm, 70° F. | 3500 |
| Propylene, mL, 70° C., 650 psi | 1200 |
| Temperature, ° C. | 70 |
| Run Time, min | 60 |
| Gas Phase Polymerization | |
| Gas Phase Temperature, ° C. | 70 |
| Gas Phase H2 amount, mol % | 2.5 |
| Gas Phase pressure, psig | 180 |
| Gas Phase Ethylene, mol % | 30 |
| Gas Phase Propylene, mol % | 67.5 |
| Gas Phase Run Time, min | 30 |

Example II

Bimodal Polypropylene Having High Melt Flow Rate & Produced by Present Methods The present methods include a two-stage polymerization process. In the first stage, slurry polymerization was performed with zero to minimal $H_2$ to produce high molecular weight polypropylene. In the second stage, gas phase polymerization was performed with high $H_2$ to produce low molecular weight polypropylene. General process conditions are shown immediately below in Tables 3A and 3B.

TABLE 3A

| | | | | | | | |
|---|---|---|---|---|---|---|---|
| | | Slurry Phase - Polypropylene | | | | | |
| Catalyst | Catalyst amount, mg | TEAL amount (1M in hexane), mL | mixed amount (0.1M in hexane), mL | $H_2$, sccm @ 70° C. and 1 atm | Propylene charge, mL @ 70° C. 650 psig | Temperature ° C. | Run time, min |
| Ziegler-Natta | 75 | 2 | 2 | 0 | 1200 | 70 | 30 |

TABLE 3B

| | | | | | |
|---|---|---|---|---|---|
| | | Gas Phase - Polypropylene | | | |
| Temperature ° C. | Reactor pressure, psig | $H_2$, mol % | Ethylene, mol % | Propylene, mol % | Run time, min |
| 70 | 180 | 10 | 0 | 99.8 | 30 |

The two-stage polymerization process began by purging a 2 L lab scale reactor with $N_2$. 2 mL of a mixed external electron donor (DCPMS and PTES) and 2 mL of a tetraethyl aluminum cocatalyst were then added into the reactor. Zero to minimal $H_2$ was then added. 75 mg of a Ziegler-Natta catalyst and 1200 mL of propylene were then added to the reactor to start the reaction. The reaction was performed at a temperature of about 70° C., ±10° C., for about 30 minutes.

After the slurry polymerization, unreacted propylene monomer was partially vented to a pressure of about 180 psig to convert propylene into gas form. $H_2$ was injected into the reactor until the $H_2$ concentration was about 10 mol %. The reaction then continued into the gas phase to make 99.8 mol % high molecular weight polypropylene from slurry phase polymerization and a low molecular weight polypropylene from gas phase polymerization. The reaction was performed at a temperature of about 70° C., ±10° C., for about 30 minutes.

Example III

New Process of Making Impact Propylene Copolymers

As described herein, the present methods include an optional second gas phase to produce impact copolymers. After gas phase polymerization, ethylene and propylene were added in a second gas phase to produce ethylene-propylene rubber. Process conditions are shown immediately below in Tables 4A, 4B, and 4C.

TABLE 4A

| | | | | | | | |
|---|---|---|---|---|---|---|---|
| | | | Slurry Phase - Polypropylene | | | | |
| Catalyst | Catalyst amount, mg | TEAL amount, mL | Mixed electron donor amount, mL | $H_2$ sccm @ 70° C. and 1 atm | Propylene charge, mL @ 70° C. 650 psig | Temperature ° C. | Run time, min |
| Ziegler-Natta | 75 | 2 | 2 | 0 | 1200 | 70 | 30 |

TABLE 4B

| | | | Gas Phase- Polypropylene | | |
|---|---|---|---|---|---|
| Temperature, ° C. | Reactor pressure, psig | $H_2$, mol % | Ethylene, mol % | Propylene, mol % | Run time, min |
| 70 | 180 | 10 | 0 | 99.8 | 30 |

TABLE 4C

| | | | Ethylene-Propylene Rubber (Impact Copolymer "ICP") Gas Phase | | |
|---|---|---|---|---|---|
| Temperature, ° C. | Reactor pressure, psig | $H_2$, mol % | Ethylene, mol % | Propylene, mol % | Run time, min |
| 70 | 180 | 2.5 | 30 | 67.5 | 30 |

After a first gas phase polymerization, 30 mol % ethylene, 67.5 mol % propylene, and 2.5 mol % $H_2$ were added to the reactor. The mol % of ethylene, propylene, and $H_2$ were carefully maintained to produce ethylene-propylene rubber. The operating temperature of the gas phase was about 70° C. and the reaction ran for about 30 minutes.

Example IV

Comparison of Polypropylene Produced

In order to demonstrate the bimodality and advantages thereof of the present polypropylene, polypropylene was compared to traditional unimodal polypropylene. Table 5 immediately below shows weight-, number-, and z-average molecular weights, as well as polydispersity index, for three polypropylene samples and a control unimodal polypropylene.

TABLE 5

| | $M_w$ (Da) | $M_n$ (Da) | $M_w/M_n$ | $M_z$ (Da) |
|---|---|---|---|---|
| Bimodal Polymer1 | 853,100 | 43,900 | 19.44 | 3,724,800 |
| Bimodal Polymer2 | 713,100 | 36,600 | 19.48 | 3,616,100 |
| Bimodal Polymer3 | 797,200 | 38,900 | 20.52 | 3,632,700 |
| Control | 221,056 | 33,442 | 6.61 | 856,641 |

Figure 4:
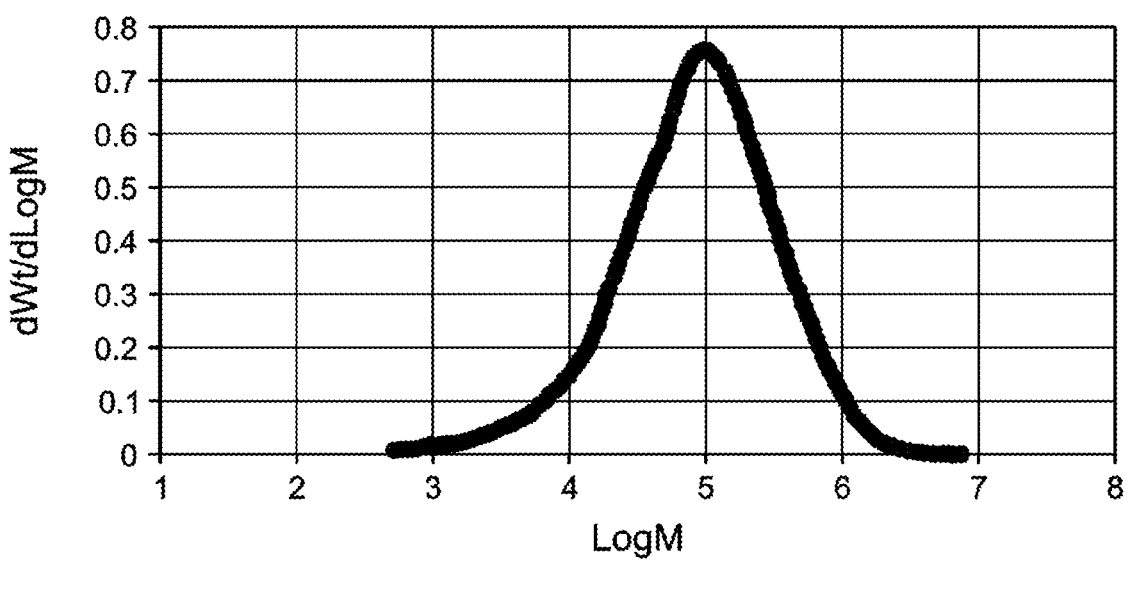
FIG. 4 is a graph depicting molecular weight distribution of a unimodal polypropylene.
Figure 5:
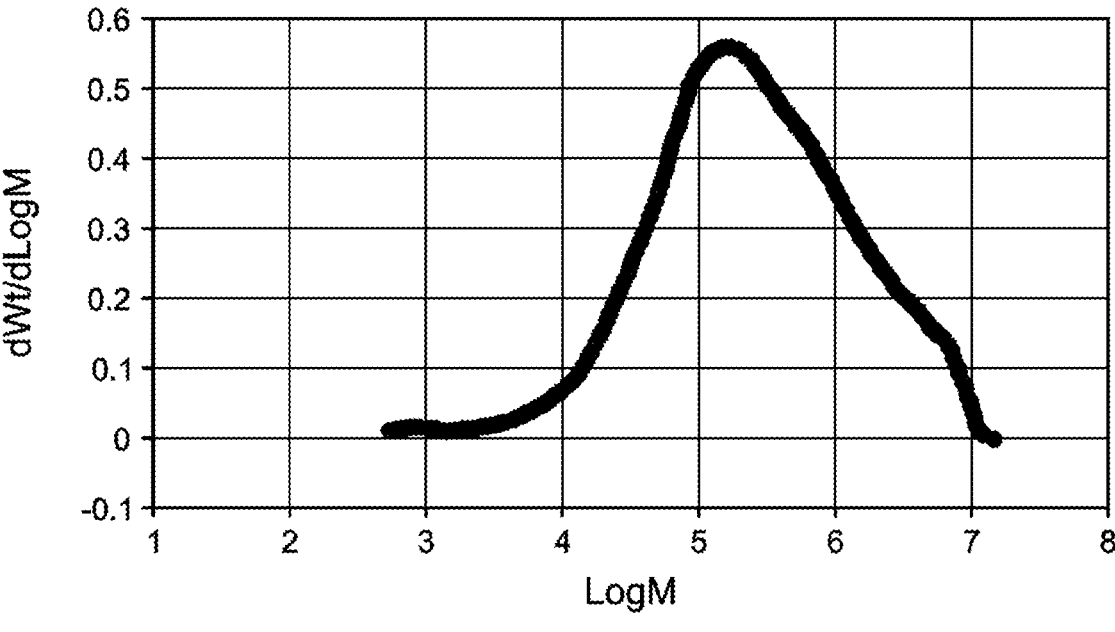
FIG. 5 is a graph depicting molecular weight distribution of bimodal polypropylene.

FIG. 4 shows the molecular weight distribution of the unimodal control polypropylene. The symmetry of the distribution, along with the low polydispersity index value of 6.61, indicate that the control polypropylene had a single narrow molecular weight distribution. Furthermore, FIG. 5 shows that the molecular weight distribution of polypropylene was asymmetrically skewed toward higher molecular weight values and had at least one additional peak (high molecular weight shoulder), demonstrating a bimodal distribution.

Figure 6:
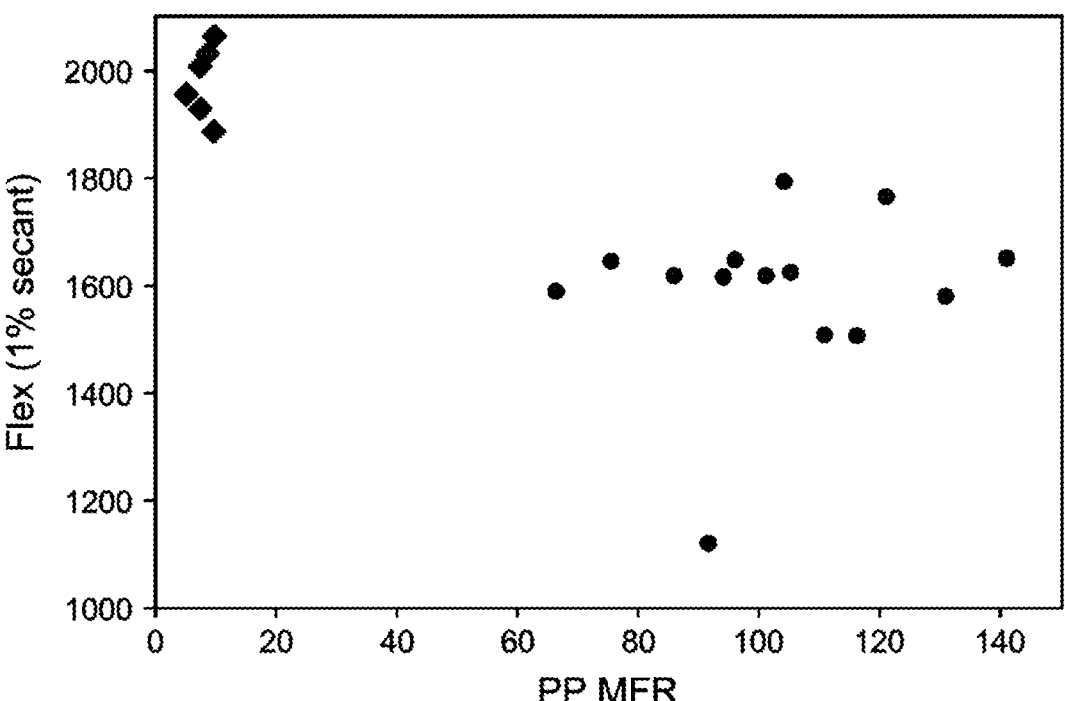
FIG. 6 is a graph depicting 1% secant flex modulus as a function of melt flow rate for bimodal polypropylene produced with the present methods.

FIG. 6 shows 1% secant modulus and melt flow rate for the unimodal control polypropylene and bimodal polypropylene. Unimodal polypropylene had 1% secant modulus values between about 1,900 MPa and about 2,100 MPa. Bimodal polypropylene 1% secant modulus values were significantly higher than those of the unimodal control polypropylene, demonstrating increased stiffness of the polypropylene. The polypropylene had a melt flow rate between about 60 g/10 min and about 150 g/10 min.

It is to be understood that this disclosure is not limited to specific compounds, components, compositions, reactants, reaction conditions, ligands, catalyst structures, metallocene structures, or the like, as such may vary, unless otherwise specified. It is also to be understood that the terminology used herein is for the purpose of describing particular aspects only and is not intended to be limiting.

All numerical values within the detailed description and the claims can modified by "about" or "approximately" the indicated value, taking into account experimental error and variations.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, within a range includes every point or individual value between its end points even though not explicitly recited. Thus, every point or individual value may serve as its own lower or upper limit combined with any other point or individual value or any other lower or upper limit, to recite a range not explicitly recited.

What is claimed is:

1. A method for producing polypropylene comprising the steps of:

polymerizing propylene monomer with a catalyst in a slurry to produce an effluent comprising a high molecular weight polypropylene having a weight average molecular weight (Mw) of between about 500 kDa and 1000 kDa and non-polymerized propylene monomer; and reacting the catalyst and additional propylene monomer in the presence of the high molecular weight polypropylene with hydrogen in a first gas phase to produce low molecular weight polypropylene having a weight average molecular weight of between about 20 kDa to 150 kDa, wherein the produced polypropylene has a flex modulus of at least about 1500 MPa.

2. The method of claim 1, wherein polymerizing propylene monomer with a catalyst in a slurry is performed in a slurry polymerization reactor.

3. The method of claim 1, wherein reacting in the first gas phase occurs in a gas phase polymerization reactor.

4. The method of claim 1, wherein the low molecular weight polypropylene has a molecular weight distribution of between about 3.0 and about 40.0.

5. The method of claim 1, wherein the low molecular weight polypropylene has a flexural modulus between about 1500 mPa and 1900 mPa.

6. The method of claim 1, wherein a mole ratio of hydrogen to propylene monomer in the first gas phase is between about 0.02 to about 0.3.

7. The method of claim 1, further comprising the step of polymerizing the high molecular weight polypropylene and the low molecular weight polypropylene with ethylene and propylene in a second gas phase with hydrogen to produce an impact copolymer.

8. The method of claim 7, wherein a second effluent is drawn from the second gas phase and the second effluent comprises the impact copolymer.

9. The method of claim 7, wherein the impact copolymer has a melt flow rate (230° C./2.16 kg) within a range of from 5.0 g/10 min to 50 g/10 min.

10. The method of claim 7, wherein the impact copolymer has a Notched Izod impact, according to ASTM D256 at 21° C., between about 400 J/m and about 1000 J/m.

11. The method of claim 1, wherein propylene monomer is recycled to the slurry.

12. The method of claim 1, wherein the polypropylene has a molecular weight distribution between about 4.0 to about 20.

13. The method of claim 1, wherein pressure of the slurry is between about 430 psig to about 510 psig and wherein temperature of the slurry is between about 60° C. and about 80° C.

14. The method of claim 1, wherein pressure of the first gas phase is between about 180 psig to about 300 psig and wherein temperature of the first gas phase is between about 60° C. and about 90° C.

15. The method of claim 1, wherein reaction residence time in the slurry is between about 30 minutes to about 90 minutes and wherein a residence time in the first gas phase is between about 30 minutes to about 180 minutes.

16. The method of claim 1, wherein hydrogen is fed to the first gas phase at a flow rate of between about 1000 sccm to about 5000 sccm.

17. The method of claim 1, wherein the polypropylene has a melt flow rate (230° C./2.16 kg) within a range of from 5.0 g/10 min to 50 g/10 min.

18. The method of claim 1, wherein polypropylene has a Notched Izod impact, according to ASTM D256 at 21° C., between about 0 J/m and about 6 J/m.

19. A method for producing polypropylene comprising the steps of:

contacting a propylene monomer with a catalyst in a slurry polymerization reactor to produce an effluent comprising a high molecular weight polypropylene and propylene monomer, the high molecular weight polypropylene having a weight average molecular weight (Mw) of between about 500 kDa and 1000 kDa; and feeding hydrogen and the effluent into a gas phase polymerization reactor to produce low molecular weight polypropylene having a weight average molecular weight of between about 20 kDa and about 150 kDa and a flexural modulus between about 1500 mPa and 1900 mPa, wherein a mole ratio of hydrogen to propylene monomer in the gas phase is between about 0.02 to about 0.3.

20. A method for producing bimodal polyolefin comprising the steps of:

contacting α-olefin monomers with a catalyst in slurry polymerization conditions in the presence or absence of hydrogen to produce a high molecular weight polyolefin; and contacting additional α-olefin monomers in gas phase polymerization conditions in the presence of hydrogen and the high molecular weight polyolefin and the catalyst to produce bimodal polyolefin having a molecular weight distribution of between about 3.0 and about 40.0, a flexural modulus of at least 1500 MPa and a melt flow rate between about 50 g/10 min and about 150 g/min;

wherein a mole ratio of hydrogen to α-olefin monomers in the gas phase is between about 0.02 to about 0.3.

\* \* \* \* \*